Jan. 14, 1936.　　C. T. HUTCHENS ET AL　　2,028,127
TRUSSED TRAILER AXLE
Filed Oct. 20, 1934　　2 Sheets-Sheet 1

Inventors
C. T. Hutchens, and
V. V. Anderson.
By Milo B. Stevens &Co.
Attorneys

Inventors
C. T. Hutchens, and
V. V. Anderson.

Patented Jan. 14, 1936

2,028,127

UNITED STATES PATENT OFFICE 2,028,127

TRUSSED TRAILER AXLE

Charles T. Hutchens and Virgil V. Anderson, Springfield, Mo.

Application October 20, 1934, Serial No. 749,295

7 Claims. (Cl. 267—66)

My invention relates to improvements in bracing or trussing means for axles of wheeled vehicles and refers particularly to axles for trailers for motor trucks, or other motor vehicles. Such trailers generally have but a single axle which carries either a pair of single or dual wheels thereon, depending upon the work for which the trailer is to be used. As a general rule, a pair of dual wheels are used and such trailers carry loads of a relatively great weight. The resultant stresses imposed upon the single axle are far in excess of those which would be imposed upon the rear axle of a two axled vehicle carrying the same load. In practice, it has been found that these heavy loads have a tendency to cause the trailer axle to buckle downwardly between the wheels. This, of course, destroys the correct camber of the wheels, causes the tires to wear unevenly, and, in the case of a trailer having dual wheels at each end of the axle, throws most of the weight on the inner pair of tires and results in a material shortening of their lives.

An object of my invention is to provide an improved trussing means for axles.

A further object is to provide an adjustable trussing means for axles.

A further object is to provide a trussing means for axles which includes means for adjusting the camber of the wheels whenever necessary.

A further object is to provide trussing means which will prevent distortion of the axle without adding unduly to the weight thereof.

A further object is to provide a trussing means which reinforces the axle between the point of load and the point of suspension.

Other objects and advantages reside in the form and structure of the invention, combination and arrangement of the various parts and in certain modes of operation,—all of which will be readily apparent to those skilled in the art upon reference to the drawings in connection with the following detailed description which forms a part of this specification.

Figure 1:
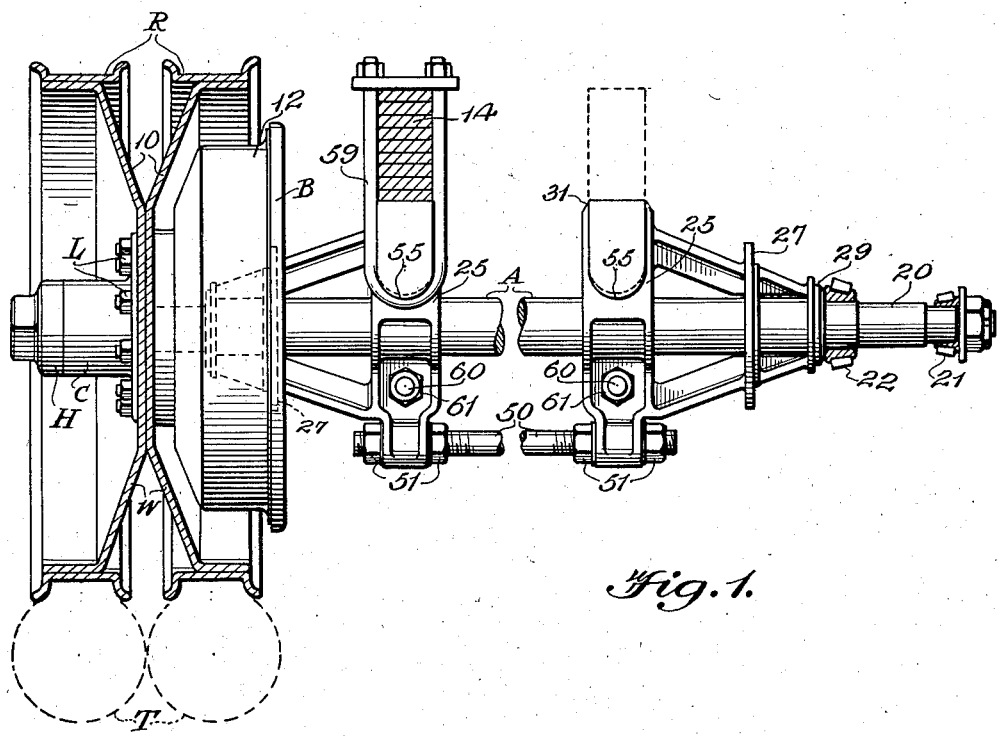
Figure 1 is a side elevation of an axle embodying our invention and taken from the rear of the vehicle, with the central part of the axle broken away, and with the wheels, brake drum and spring removed from one end of the axle.
Figure 2:
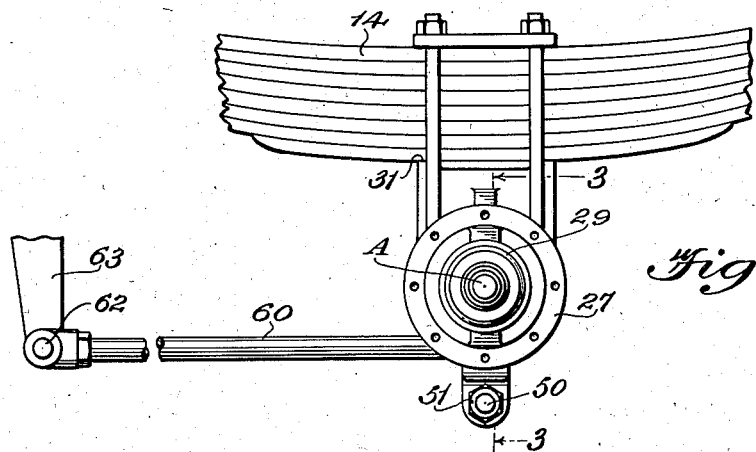
Figure 2 is an end elevation thereof with the wheels and brake drum removed.

With further reference to the drawings, in which like reference characters have been used throughout to designate like parts, the reference character A designates the axle, and 10 a typical dual wheel assembly comprising disc wheels W having rims R and tires T. Lugs L or other suitable means may be used to connect the two wheels W together, and to the axle assembly. A brake drum 12 is located inwardly of the wheel assembly 10 and springs 14 are located inwardly of the drums 12, the mounting means of which will be described later. Hub caps H and casings C enclose the spindles 20 of the axle 10. Suitable wheel bearings 21 and 22 may be mounted on suitable bearing seats on the spindle 20.

My truss comprises a pair of identical castings 25, each of which includes a flange 27 for mounting the brakes B, and a seat 29 for the inner face of the inside wheel bearing 22. Respectively below and above the axle A, are flanged ribs 33 and 35 which extend from the bearing seat 29 to the inner end of the casting 25. These ribs 33 and 35, as they extend inwardly, diverge from each other so as to form a V-shaped structure when viewed from the front or rear, which has its apex towards the adjacent outer end of the axle. Apertures 25a, 27a and 29a are provided axially of the casting to permit the passage of the axle therethrough. A flattened portion 31 is provided on the top of the inner end of the casting 25 to provide a seat for the spring 14.

The axle A is inserted through the openings 25a, 27a, and 29a until the spindle 20 extends outwardly of the apex thereof. The casting 25 is then electrically or otherwise welded to the axle and becomes an integral part thereof. The other casting 25 is similarly secured to the other end of the axle.

It will be noted that on the inner end of each casting 25 and below the opening 25a in the collar 25b thereof (see Figs. 3 and 4) is a depending rib 37 which has a flanged portion 37a in which the inner end of the lower bracing rib 33 terminates. An aperture 38 is formed in said rib transversely of the same. A stabilizer rod 60 fits in the aperture 38 and is adjustably connected to the rib 37 by means of nuts 61 on either side thereof. The stabilizer rod 60 extends forwardly under the vehicle and is suitably attached as at 62 to a member 63 carried by the underside of the vehicle body. By means of these stabilizer rods, the axle and its attached castings 25 are prevented from twisting when subjected to torsional stresses, as, for instance, when the brakes are applied. At the same time it is apparent that the stabilizer rods do not interfere with movement of the axle in a vertical plane to exert a normal stress on the springs. However, by preventing any torsional or longitudinal movement of the axle, none is transmitted to the springs by reason of a rough road, the starting of the car, the application of the brakes, or other cause. This restricted movement is obviously beneficial to the springs and adds materially to their longevity.

The extreme lower end of the rib 37 is thickened and pierced to form a collar 28 having an opening 28a therein. As is readily apparent from Figures 3 and 4, the aperture 28a pierces the rib 37 at right angles to the aperture 38, or in a transverse direction with respect to the vehicle. One end of a truss rod 50 is extended through the aperture 28a and is suitable and adjustably secured to the rib 37 by the nuts 51 on either side thereof. By means of the nuts 51, the camber of the wheels can be adjusted so as to distribute the weight equally on both the inner and outer wheels of the dual wheel assemblies. Moreover, in the event that one tire of a dual wheel is worn more than the other, the resultant difference in the diameter of the two tires can be compensated for by suitably adjusting the truss rod nuts 51. In this manner, also, the weight on both the inner and outer wheel bearings 22 and 21 is equalized. This reduces bearing wear and allows the wheels to turn with less friction.

Figure 4:
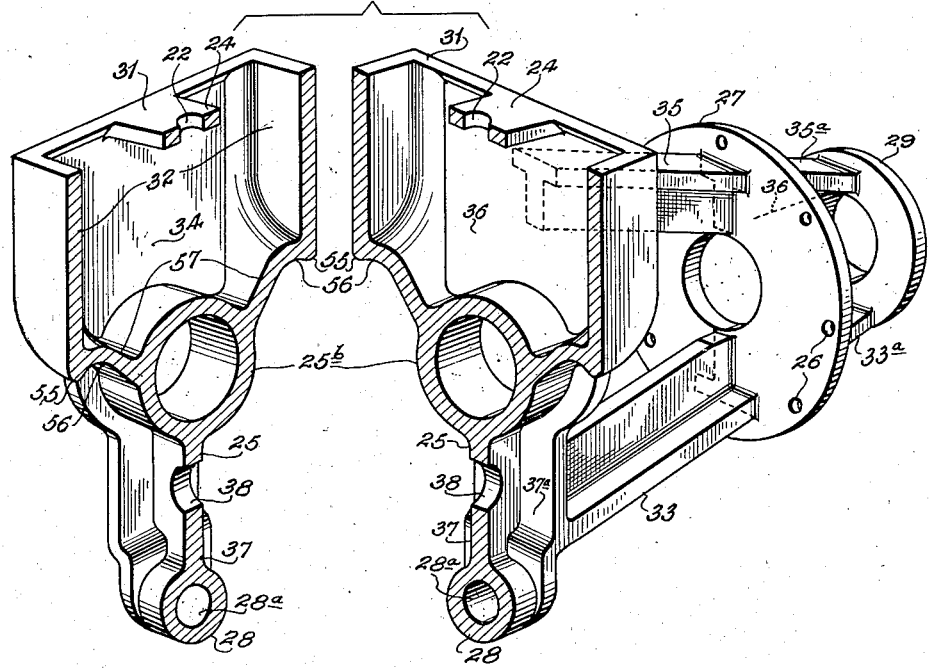
Figure 4 is a composite perspective view showing a vertical section taken approximately on the line 4—4 of Fig. 3.

The upper portion of the inner end of the casting 25 is enlarged and hollowed, as is readily seen from a glance at Figure 4. This portion of the casting comprises side walls 34 and 36 and end walls 32, which are connected to the collar 25b by ribs 57. It will be noted that the lower ends 55 of the end walls 32 extend somewhat below the ribs 37 to provide recesses 56 which serve as seats for U-bolts 59 which, in turn, secure the springs 14 to the castings 25. The flattened spring seating portions 31 of the castings are preferably open at the top to reduce weight and to make for greater ease in forming the casting. However, they should be formed with a connecting portion 24 between the side walls 34 and 36, and this portion 24 may be provided with an aperture 22 through which a bolt or other securing means (not shown) may be extended and attached to the spring as an additional means for securing the spring to the casting.

Figure 3:
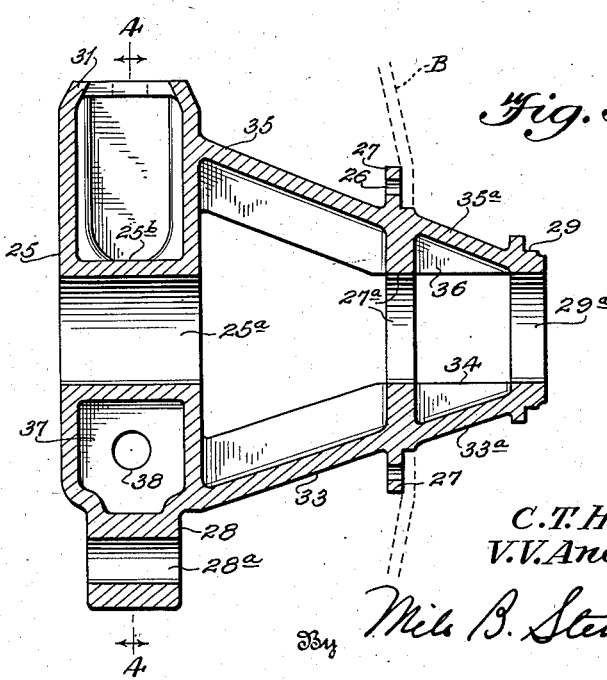
Figure 3 is an enlarged vertical section taken on the line 3—3 of Fig. 2.

By referring to Figures 1 and 3, it is seen that the brake proper B, is secured to the flange 27 of the casting 25 by means of suitable securing members, as bolts (not shown) which are passed through the marginal apertures 26 in the flange. The brake drum 12 is secured to the inner wheel of the dual wheel assembly 10 in any suitable manner.

As can be readily seen by the dotted lines at the left end of Figure 1, the upper and lower bracing ribs 35 and 33 extend from the spring seat 31, at which point the load is imposed, through the brake B and terminate at the inner bearing seat 29, which is the point of suspension of the axle. By reason of the slope of the bracing ribs 33 and 35, the portion of the axle A between the point of load and the point of suspension is rigidly held against buckling or sagging or any other movement which would destroy the correct camber of the wheels. Buckling between the castings is prevented by the truss rod 50 and the assembly of axle and castings is maintained against tortional stresses by means of the stabilizer rod 60.

By means of the axle and casting assembly just described, it is possible to produce an axle capable of carrying extremely heavy loads without increasing the size of the axle itself. An untrussed axle capable of supporting a load equal to that which the trussed axle hereinabove described can support would necessarily have to be a great deal heavier and larger than ours, and, consequently, a great deal more expensive, as an increased amount of high grade steel is necessary. Naturally this is much more expensive than the castings called for above which allow us to use a relatively light steel axle with our trussed arrangement. Also, our axle is substantially lighter in weight and has the additional feature of adjustability which could not be incorporated into a heavier and/or untrussed axle.

Of course, our invention is susceptible of many variations and modifications without departing from the spirit of the invention, and we do not limit ourselves to the precise structure as shown, but only as hereinafter claimed.

Having thus described our invention, we claim:

1. A trussed vehicle axle including trussing means carried adjacent either end of said axle and extending above and below the same, braces on either side of said axle and embodied in said trussing means, said braces being spaced from each other at the points of load but converging at the points of suspension, means extending at right angles to said axle and carried by said trussing means and the vehicle body to brace the same against torsional stresses, and means connecting said trussing means to each other.

2. A trussed vehicle axle comprising an axle having spindles on either end thereof, a pair of castings integrally mounted on said axle and extending inwardly along the same from said spindles and having portions extending above and below said axle, said castings having their upper inner portions adapted to support the load, braces extending towards said spindles from the upper and lower inner portions of said castings and converging at the point of load, means adjustably carried by the lower inner portions of said castings and the vehicle body to grace said axle against torsional stresses, and means connecting said trussing means together.

3. A trussed vehicle axle comprising an axle having spindles on either end thereof, a pair of castings integrally mounted on said axle and extending inwardly along the same from said spindles, said castings having portions extending above and below said axle, load supporting portions formed on the upper inner ends of said castings, bracing portions on said castings and extending towards said spindles from the upper and lower inner end portions of said castings, and converging at the points of suspension, brake mounting means formed on said bracing portions, and a truss rod below said axle and connecting said castings.

4. The structure of claim 3, and the converging end portions of said bracing portions being formed to provide wheel bearing seats.

5. The structure of claim 3, and wheel camber adjusting means carried by said truss rod.

6. The structure of claim 3, wheel camber adjusting means carried by said truss rod, and means extending at right angles to said axle and having one end adjustably carried by said castings, and the other attached to the vehicle body for bracing the same against torsional stresses.

7. The structure of claim 3, the converging end portions of said braces being formed to provide wheel bearing seats, wheel camber adjusting means carried by said truss rod, and stabilizer rods extending at right angles to said axle, said rods having one end adjustably connected to said casting and their other ends attached to the vehicle body.

CHARLES T. HUTCHENS.
VIRGIL V. ANDERSON.